(12) United States Patent
Baral et al.

(10) Patent No.: US 11,520,810 B2
(45) Date of Patent: *Dec. 6, 2022

(54) SUBJECT MATTER EXPERT KNOWLEDGE MAPPING USING DYNAMIC CLUSTERING

(71) Applicant: General Electric Company, Schenectady, NY (US)

(72) Inventors: Arindam Baral, Bangalore (IN); Nagendra Perugupalli, Bangalore (IN); Manohar Swamynathan, Bangalore (IN); Abhishek Narain, San Ramon, CA (US)

(73) Assignee: General Electric Company, Schenectady, NY (US)

( * ) Notice: Subject to any disclaimer, the term of this patent is extended or adjusted under 35 U.S.C. 154(b) by 140 days.

This patent is subject to a terminal disclaimer.

(21) Appl. No.: 16/720,904

(22) Filed: Dec. 19, 2019

(65) Prior Publication Data
US 2020/0125589 A1    Apr. 23, 2020

Related U.S. Application Data

(63) Continuation of application No. 15/659,879, filed on Jul. 26, 2017, now Pat. No. 10,521,457.

(51) Int. Cl.
*G06F 16/28* (2019.01)
*G06F 16/2457* (2019.01)
*G06N 5/02* (2006.01)

(52) U.S. Cl.
CPC ...... *G06F 16/285* (2019.01); *G06F 16/24578* (2019.01); *G06F 16/287* (2019.01); *G06N 5/02* (2013.01)

(58) Field of Classification Search
CPC .......... G06F 16/285; G06F 16/287; G06F 16/24578; G06N 5/02; G06N 5/022
See application file for complete search history.

(56) References Cited

U.S. PATENT DOCUMENTS

| | | | | |
|---|---|---|---|---|
| 8,527,811 | B2 * | 9/2013 | Gilbert | H04L 41/065 714/26 |
| 9,027,121 | B2 * | 5/2015 | Hammer | G06F 21/554 726/22 |
| 9,317,829 | B2 * | 4/2016 | Anand | G06N 7/005 |
| 2009/0313219 | A1 * | 12/2009 | Gupta | G06Q 10/10 |

(Continued)

*Primary Examiner* — Jorge A Casanova
(74) *Attorney, Agent, or Firm* — Buckley, Maschoff & Talwalkar LLC

(57) ABSTRACT

The example embodiments are directed to a system and method that applies knowledge developed by a subject matter expert with respect to a physical asset. In one example, the method includes receiving knowledge and issue resolution information developed of subject matter experts in association with historical issues for an asset, generating a plurality of data clusters for the asset based on the knowledge, wherein each historical issue of the asset is mapped to a cluster and includes a plurality of resolutions for the issue, receiving a new issue and new issue information, and processing the new issue by extracting keywords from the new issue information and assigning the new issue to a data cluster from among the plurality of data clusters based on the extracted keywords, and outputting, to a display, a cause of the new issue and potential solutions for the new issue.

17 Claims, 5 Drawing Sheets

(56) References Cited

U.S. PATENT DOCUMENTS

| | | | |
|---|---|---|---|
| 2014/0129536 A1* | 5/2014 | Anand | G06N 7/005 707/706 |
| 2015/0356174 A1* | 12/2015 | Narayana | G06F 16/35 707/738 |
| 2016/0132372 A1* | 5/2016 | Anderson | G06F 11/0709 714/15 |
| 2017/0068963 A1* | 3/2017 | Saxena | G06Q 10/063112 |

* cited by examiner

Open work orders ~ 322

Assigned to : [ ]

| Work order number | Machine area | Summary | Symptom | Opened on | Assigned to |
|---|---|---|---|---|---|
| 15-149027 | Blades | Excessive servo lag in A | A-axis NA 1st | 2016-08-19 | 212443264 |
| 15-146868 | Nozzles | Pallet will not shuttle into machine | Pallet shuttle | 2016-08-03 | 212443256 |
| 15-147062 | Nozzles | Critical to production spindle way cover jacked up bottom | Way cover | 2016-08-05 | 212443266 |
| 15-149546 | Blades | Check for back lash in B-Axis | Checked good | 2016-08-20 | 212443255 |

Similar work orders ~ 324  From [11/07/2014]  To [12/07/2016]

| Work order number | Summary | Opened on | Assigned to |
|---|---|---|---|
| 14-161013 | AWC keeps faulting out during pallet shuttle cycle machine pallet unclamped three strickes | 2015-11-25 | 212443265 |
| 14-101154 | Pallet will not shuttle | 2015-01-08 | 212443245 |
| 15-108946 | MNF pallet not shuttling all the way out and in | 2016-01-29 | 212443263 |
| 15-108946 | MNF pallet not shuttling all the way out and in | 2016-01-29 | 212443249 |
| 14-109329 | Pallet 1st 102 won T release can T unload shuttle or mech man | 2015-02-24 | 212443266 |
| 14-119294 | Pallet shuttle not down | 2015-04-09 | 212443267 |

Recommended fix ~ 326

Pie chart:
- Common occurance: 9%
- mach rereferenced: 10%
- sequence made: 10%
- awc sequenced: 11%
- miscelleneous fix: 22%
- awc lubricated valv...: 19%
- 19%

FIG. 3B

SUBJECT MATTER EXPERT KNOWLEDGE MAPPING USING DYNAMIC CLUSTERING

CROSS-REFERENCE TO RELATED APPLICATIONS

This application is a continuation of U.S. patent application Ser. No. 15/659,879 filed on Jul. 26, 2017, in the United States Patent and Trademark Office, the entire disclosure of which is hereby incorporated herein for all purposes.

BACKGROUND

Machine and equipment assets, generally, are engineered to perform particular tasks as part of a business process. For example, assets can include, among other things and without limitation, industrial manufacturing equipment on a production line, drilling equipment for use in mining operations, wind turbines that generate electricity on a wind faun, transportation vehicles such as trains and aircraft, and the like. As another example, assets may include devices that aid in diagnosing patients such as imaging devices (e.g., X-ray or MRI systems), monitoring equipment, and the like. The design and implementation of these assets often takes into account both the physics of the task at hand, as well as the environment in which such assets are configured to operate.

Low-level software and hardware-based controllers have long been used to drive machine and equipment assets. However, the rise of inexpensive cloud computing, increasing sensor capabilities, and decreasing sensor costs, as well as the proliferation of mobile technologies have created opportunities for creating novel industrial and healthcare based assets with improved sensing technology and which are capable of transmitting data that can then be distributed throughout a network. As a consequence, there are new opportunities to enhance the business value of some assets through the use of novel industrial-focused hardware and software.

The machines and equipment that are installed in a manufacturing environment are often quite big in size and/or complex in their operations. Issues in these machines can also be quite complex and require the service of highly skilled engineers, also referred to herein as subject matter experts. When the subject matter expert performing a work order is new to the job or is not highly skilled, it can take hours, or even longer, for the expert to resolve the issues. For example, the subject matter expert typically analyzes dozens if not hundreds of sources of information, evaluates the information, and makes a best guess as to the issues and reasons for error/failure associated with the particular asset. In order to make such a determination, a subject matter expert often analyzes textual based data such as repair orders, work orders, service orders, notes made by engineers/technicians in the field, materials used, and the like. After analyzing all of this data, a subject matter expert then makes the best-guess as to the cause of an asset failure.

SUMMARY

Embodiments described herein improve upon the prior art by providing systems and methods which capture the knowledge of a subject matter expert with respect to an asset and automatically apply that knowledge to issues with the asset to assist or even take the place of the subject matter expert. For example, the subject matter expert knowledge may be captured from various opinions and solutions issued by the subject matter expert. The sources of knowledge may include repair orders, work orders, service requests, parts usage, part orders, and the like, which are used to categorize an event that has occurred with the asset, describe a part or a problem in the asset, or otherwise diagnose or characterize a state of the asset. In some examples, the embodiments herein may be incorporated within software that is deployed on a cloud platform for use with an Internet of Things (IoT) system.

In an aspect of an example embodiment, a computer-implemented method that includes receiving knowledge and issue resolution information developed by one or more subject matter experts in association with historical issues for a type of asset, generating a plurality of data clusters for the type of asset based on the received knowledge, wherein each data cluster is mapped to a historical issue with the asset and includes a plurality of resolutions for the issue, receiving a new issue including new issue information for the type of asset, and processing the new issue by extracting keywords from the new issue information and assigning the new issue to a data cluster from among the plurality of data clusters based on the extracted keywords, and outputting, to a display, a cause of the issue corresponding to the assigned data cluster and a ranking of a plurality of resolutions for a historical issue corresponding to the assigned data cluster as potential solutions for the new issue.

In an aspect of another example embodiment, a computing system includes a network interface configured to a network interface configured to receive knowledge and issue resolution information developed by one or more subject matter experts in association with historical issues for a type of asset, and to receive a new issue including new issue information for the type of asset, a processor configured to generate a plurality of data clusters for the type of asset based on the received knowledge, wherein each data cluster is mapped to a historical issue with the asset and includes a plurality of resolutions for the historical issue, and to further process the new issue by extracting keywords from the new issue information and assigning the new issue to a data cluster from among the plurality of data clusters based on the extracted keywords, and an output configured to output, to a display, a cause of the issue corresponding to the assigned data cluster and a ranking of a plurality of resolutions for a historical issue corresponding to the assigned data cluster as potential solutions for the new issue.

Other features and aspects may be apparent from the following detailed description taken in conjunction with the drawings and the claims.

BRIEF DESCRIPTION OF THE DRAWINGS

Features and advantages of the example embodiments, and the manner in which the same are accomplished, will become more readily apparent with reference to the following detailed description taken in conjunction with the accompanying drawings.

FIGS. 3A and 3B are diagrams illustrating a process of clustering knowledge from a subject matter expert in accordance with an example embodiment.

Figure 1:
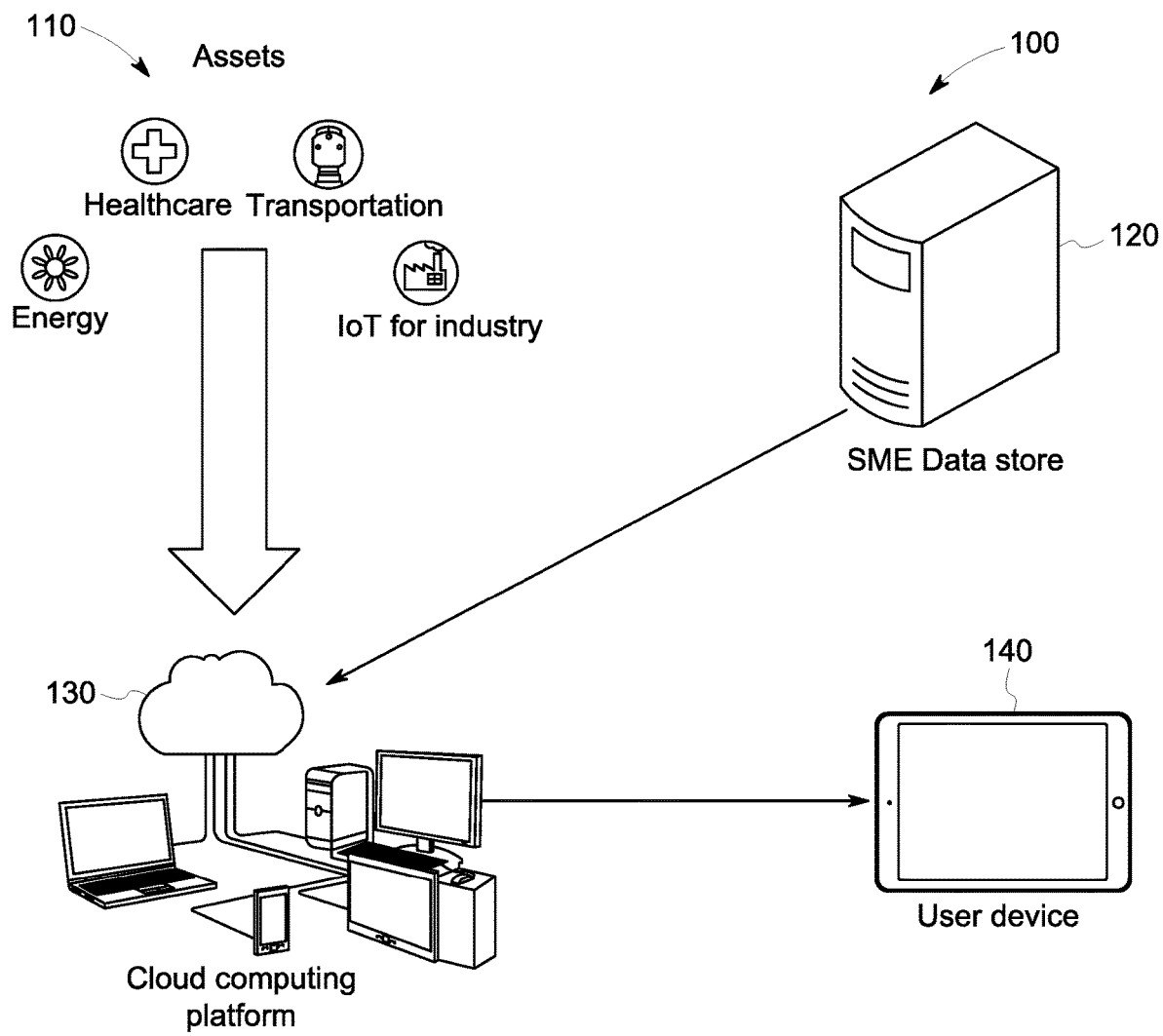
FIG. 1 is a diagram illustrating a cloud computing environment for capturing and applying a subject matter opinion in accordance with an example embodiment.

Throughout the drawings and the detailed description, unless otherwise described, the same drawing reference numerals will be understood to refer to the same elements, features, and structures. The relative size and depiction of these elements may be exaggerated or adjusted for clarity, illustration, and/or convenience.

DETAILED DESCRIPTION

In the following description, specific details are set forth in order to provide a thorough understanding of the various example embodiments. It should be appreciated that various modifications to the embodiments will be readily apparent to those skilled in the art, and the generic principles defined herein may be applied to other embodiments and applications without departing from the spirit and scope of the disclosure. Moreover, in the following description, numerous details are set forth for the purpose of explanation. However, one of ordinary skill in the art should understand that embodiments may be practiced without the use of these specific details. In other instances, well-known structures and processes are not shown or described in order not to obscure the description with unnecessary detail. Thus, the present disclosure is not intended to be limited to the embodiments shown, but is to be accorded the widest scope consistent with the principles and features disclosed herein.

As referred to herein, a subject matter expert is someone with subjective experience with a subject or topic, for example, a field of technology, a type of machine, an area of study, and the like, and may include a professional in the field, an engineer, a technician, or the like. Subject matter experts are always in high demand especially in the areas of machine and equipment repair/failure diagnosis. However, when a subject matter expert leaves an organization or moves to a different position within the organization, the organization is now devoid of the knowledge of that expert. Furthermore, an expert can take hours or even days to analyze different sources of information before making an educated guess as to the cause of an issue with a machine-based or an equipment-based asset.

The example embodiments provide a knowledge mapping software (e.g., application, service, program, code, etc.) and a system that maps historic knowledge of a subject matter experts to the system. As a result, when a new order related to an issue with an asset is received by the system, and a user (e.g., a service engineer) needs to work on the order, the user can be provided with a list possible fixes to assist the user or even take the place of the user. The possible fixes are based on previous actions taken by subject matter experts to resolve similar work orders. Alongside the possible fixes, the user may also be provided with similar work orders that have been raised in the past and who resolved the issue related thereto. By providing the user with the potential fix information, work order resolution time can be significantly reduced. Furthermore, the tool aggregates information for resolving the work orders into a single system creating a knowledge base for users.

In various embodiments, the subject matter may include industrial and/or manufacturing based equipment, machines, devices, etc., and may include healthcare machines, industrial machines, manufacturing machines, chemical processing machines, textile machines, locomotives, aircraft, energy-based machines, oil rigs, and the like. The knowledge mapping software may analyze historical issues and resolution information (e.g., work orders, repair notes, parts lists, etc.) generated by a subject matter expert or generated in association with an issue of the asset, and cluster the historical issues into various meaningful clusters. In this case, the subject matter expert knowledge can be mapped to a plurality of clusters. For example, a plurality of occurrences of a same issue may be mapped to a same cluster to identify various keywords, phrases, etc. that are used by the subject matter expert during the identification and resolution of the issue. In some cases, the clustered results can be further refined based on feedback from the subject matter expert themselves to eliminate any anomalies and further refine the learning. Based on the clustered data, the application can analyze a same type of data or a different type of data to generate a subject matter expert opinion of the data.

Recently, there has been a huge improvement in clustering algorithms. These algorithms help in clustering data into meaningful clusters. However, when there is a lot of noise in the data (very common in work order, service order, feedback info, etc.), clustering technique can generate a lot of redundant clusters. The gap in the clustering algorithms is resolved by the knowledge mapping algorithm provided herein. Furthermore, the clustered knowledge of the subject matter expert can also be used to determine a cause and a resolution for a new issue with the asset.

The knowledge mapping software may be deployed on a cloud platform computing environment, for example, an Internet of Things (IoT) or an Industrial Internet of Things (IIoT) based platform. While progress with machine and equipment automation has been made over the last several decades, and assets have become 'smarter,' the intelligence of any individual asset pales in comparison to intelligence that can be gained when multiple smart devices are connected together, for example, in the cloud. Assets, as described herein, may refer to equipment and machines used in fields such as energy, healthcare, transportation, heavy manufacturing, chemical production, printing and publishing, electronics, textiles, and the like. Aggregating data collected from or about multiple assets can enable users to improve business processes, for example by improving effectiveness of asset maintenance or improving operational performance if appropriate industrial-specific data collection and modeling technology is developed and applied.

With a projected skill gap of around 2 million workers in the manufacturing industry by 2025, there is a high priority in the industry to motivate more skilled personnel to join the sector. A significant number of retirements (around 2.7 million) are also projected by the same time. This will lead to a scenario with a lot of workers in the manufacturing industry lacking a substantial number of years of experience. Furthermore, because manufacturing and service industries go hand in hand, from the above projections it is also likely that the service industry will be hugely affected as well. In the absence of experienced personnel present to resolve complex issues, the work order resolution time will undoubtedly increase for the new service engineers.

The example embodiments including the knowledge mapping application provide respite to these service engineers. Given that the software and system stores the knowledge of work order resolution and provides possible fixes that can be carried out, it makes the life of the new service engineers easier. Also, the more an SME spends time in refining the rules in the system, the more accurate the system can become in determining the potential fixes for a work order raised. The system is able to reduce the long resolution times which would have otherwise occurred in its absence.

FIG. 1 illustrates a cloud-based system 100 for preserving and applying subject matter expert knowledge in accordance with an example embodiment. In this example, the subject matter expert is associated with one or more types of assets. Referring to FIG. 1, the system 100 includes a group of assets 110, subject matter expert (SME) data store 120, a cloud computing platform (e.g., cloud platform) 130 that represents a cloud-based environment according to various embodiments, and a user device 140. It should be appreciated that the system 100 is merely an example and may include additional devices and/or one of the devices shown may be omitted. As another example, the software described herein may be included on a single device without the interaction of a system. The cloud computing platform 130 may be one or more of a server, a computer, a database, and the like, included in a cloud-based platform. The user device 140 may include a computer, a laptop, a tablet, a mobile device, a television, an appliance, a kiosk, and the like. In the example of FIG. 1, the assets 110, the SME data store 120, and/or the user device 140 may be connected to the cloud platform 130 via a network such as the Internet.

An asset 110 may be outfitted with one or more sensors configured to monitor respective operations or conditions. Data from the sensors can be recorded or transmitted to the cloud-based or other remote computing environment described herein. By bringing such data into a cloud-based computing environment 100, subject matter experts may analyze issues such as machine or equipment failure and provide a subjective opinion as to the reason for such failure, part classification, and the like, based on a totality of evidence (e.g., textual data, sensor data, etc.) from multiple and different sources. These opinions along with the data used by the subject matter expert to make such an opinion may be stored in SME data store 120. Insights gained through analysis of such data can lead to enhanced asset designs, enhanced software algorithms for operating the same or similar assets, better operating efficiency, and the like. In addition, analytics may be used to analyze, evaluate, and further understand issues related to operation of the asset within manufacturing and/or industry. However, expert opinions can often take a significant amount of time because it requires the expert to read through significant amounts of data, apply their personal knowledge and subject matter on the subject matter, and render an opinion. Furthermore, a subject matter expert is not always right. In fact, it is estimated that only 50-60% will two experts agree on the cause of an issue with an asset.

According to various embodiments, the knowledge mapping software learns from the knowledge of a subject matter expert based on historical issues of an asset the opinions of the subject matter expert with respect to those historical issues, generates a clustering algorithm based on what is learned, and applies the clustered knowledge to new issues associated with the asset. The knowledge mapping software may be deployed on the cloud computing platform 130. The software may receive new data about an issue with the asset and determine a cause/reason for the issue and possible resolutions based on the clustered knowledge of the subject matter expert without the need for the subject matter expert to become involved. Accordingly, if the subject matter expert is unavailable for whatever reason, or merely to supplement a subject matter expert's opinion, the software described herein may provide an automated determination of a cause for an issue as well as a resolution of the issue for an asset and output the determination to a screen of the user device 140.

Subject matter expert data with respect to a type of asset such as a particular machine or equipment used in industry/manufacturing may be stored in SME data store 120. For example, the subject matter expert data may include the determination of the cause of a failure rendered by the subject matter expert themselves as well as data related to the failure which was used by the subject matter expert in rendering the opinion. The related data may not be prepared by the subject matter expert but may be prepared by others in response to the failure such as work orders, workshop notes, material purchase orders, repair orders, and the like, with respect to a particular type of asset. The data may include textual based data that is provided when repairing or fixing the asset and which is used by the subject matter expert in making a determination.

The software application described herein and deployed on the cloud platform 130 in FIG. 1 may learn from the subject matter expert data stored in the SME data store 120, and generate a subject matter expert knowledge mapping. For example, the historical information provided in connection with previous with a type of asset may be analyzed and clustered into different failure topics or causes. As will be appreciated, a type of asset (e.g., type of machine or equipment) may have hundreds of causes of failure. For example, a healthcare machine or a manufacturing machine may have hundreds of parts and/or software that need repair or replacement. Accordingly, there may be hundreds of clusters of textual data as well as opinion information of the subject matter expert for each cause of failure.

The clustering may include clustering textual data from work orders, material orders, repair notes, and the like, into a particular cause from among a plurality of causes for a type of asset. That is, the cause may be identified by a subject matter expert while the associated data may be used by the subject matter expert to render the opinion. In some examples, each cause may correspond to a single cluster, however, the embodiments are not limited thereto. When new failure information of the same type asset is received, for example, from an asset 110 or a system associated with the asset 110, the failure information may processed by the application deployed on the cloud platform 130 to automatically determine a cause for the failure based on the subject matter knowledge mapping as well as to determine possible resolutions for the failure.

The determined failure may be output to a display screen of the user device 140, or another device. For example, the user device 140 (e.g., computer, mobile device, workstation, tablet, laptop, appliance, kiosk, and the like) may be configured for data communication with the cloud computing platform 130. The user device 140 can be used to monitor or control an asset 110, or shipping plans, maintenance plans, repairs, and the like, related to the asset 110. In an example, information about a cause of failure of the asset 110 may be presented to an operator via a display of the user device 140. The user device 140 can include options and hardware for scheduling repairs and/or parts for the asset 110. As another example, the user device 140 may correspond to a device of a subject matter expert themselves. The subject matter expert (via the user device 140) may remotely connect to the application deployed on the cloud platform 130 and modify the subject matter expert mapping by removing anomalies or refining particular keywords/phrases to further enhance the correctness of the determination.

Figure 2:
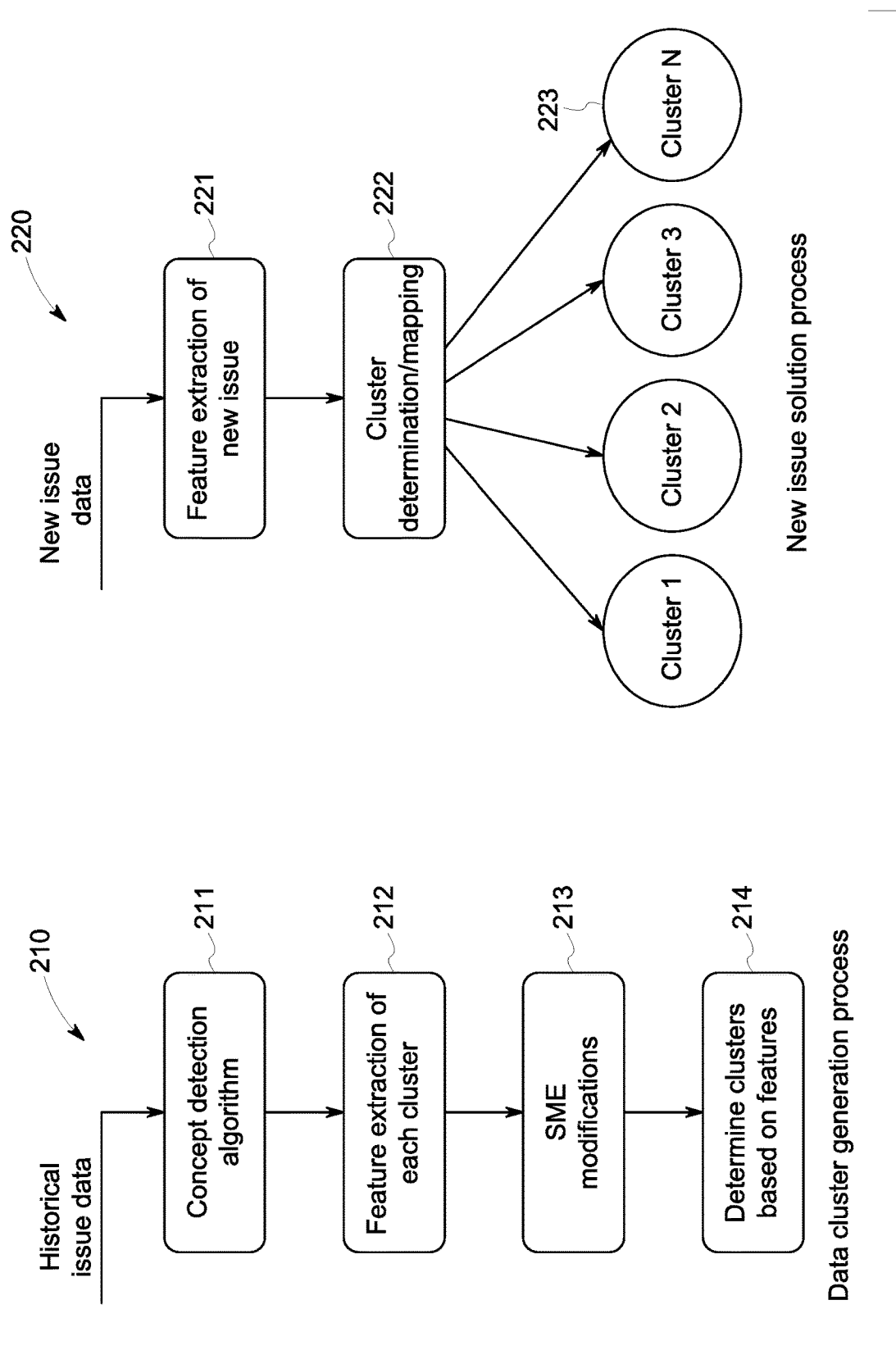
FIG. 2 is a diagram illustrating a process for capturing and applying knowledge from a subject matter expert in accordance with an example embodiment.

FIG. 2 illustrates processes for capturing and applying knowledge from a subject matter expert in accordance with an example embodiment. Referring to FIG. 2, process 210 illustrates an example of generating clusters of knowledge related to issues with an asset, and process 220 illustrates an example of applying the clustered knowledge to a new issue with respect to the asset. The process 210 may analyze historic work order data (with fix information) and dynamically assign clusters to the work orders. To refine the results, the process 210 allows the users/subject matter experts to add/modify the keywords/features used to create the clusters. Alongside, it also determines the ways to resolve any work order.

There are two algorithms which serve as the base for the process 210. In 211, the process performs concept detection based on a concept detection algorithm which may use multiple steps to determine the key concepts from the dataset. For example, the various steps involved in this concept detection process may include preprocessing the input text which may include special character removal, stemming, stop words removal, and the like. In 212, the process determines features and/or keywords from the preprocessed input text. For example, the determining in 212 may be performed based on a feature/keyword extraction algorithm such as a rapid automatic keyword extraction (RAKE) algorithm. The RAKE algorithm may be used to extract keywords from text by identifying runs of words that do not include stop words and then scoring these phrases across the document. It requires no training and the only input may be a list of stop words for a given language, and a tokenizer that splits the text into sentences and sentences into words.

In 213, the process includes receiving feedback from one or more subject matter experts who can add/modify/delete the features/keywords that are used to determine the cluster (the concept) for any work order. This enables the clusters to be accurate for any new work order using the feedback loop from the subject matter expert. In 214, the process include final cluster formation based on the extracted features. For example, cluster label induction, cluster content discovery, and final cluster formation may be performed based on the extracted keywords and features (which may be modified and enhanced by a SME). This approach combines advanced clustering, feature extraction, classification and a user feedback loop. It does so using historical work order data. At the beginning (while setting up the system), the historical work order data that has been previously resolved may be uploaded to the system. This will create the rules to determine how any new work order will be assigned to a specific cluster or group of clusters. The subject matter expert can log on to the system to alter the rules based on his/her experience. The system ranks the potential resolutions extracted from the closed work orders for a cluster. This ranking may be performed based on the frequency of occurrence of the resolution phrase in that particular cluster.

Now, referring to process 220, the process may be used to classify a new issue that has new issue information (e.g., work order, repair order, notes, parts list, etc.) associated with it. When the system receives the new issue and the information associated therewith, the system can extract features/keywords from the received information, in 221. Over the years, there has been a huge improvement in clustering algorithms. These algorithms help in clustering data into meaningful clusters. However, when there is a lot of noise in the data (very common in work order, service order, feedback info, etc.), clustering technique creates a lot of redundant clusters. We realize this gap in the clustering algorithms and hence came up with a knowledge mapping algorithm which helps fix this issue. For example, in 222 the knowledge mapping algorithm can identify which of the predetermined cluster(s) any new work order falls under. Using historical work order data used for model development, and also provide potential resolutions exist for work orders that make up a cluster, in 223.

To provide more options to the end users, we also show, for a given work order, similar (closed) work orders from the past. This enables the users to understand the various issues that have been raised in the past as well as talk to the service personnel who has fixed these issues previously. For any new work order, the features/keywords are extracted and based on the rules already forming during the system setup process in 210, the work order is mapped to the appropriate cluster(s) and the potential fixes are displayed based on the process 220. All the information related to work order resolution is thus brought to a single system and the work order fix information is readily provided, thereby enabling quick diagnosis and resolution of work orders.

As shown in these examples, based on the SME's knowledge and clustered information, possible fixes and similar (fixed) work orders corresponding to any new work order are displayed. The solution is highly beneficial in resolving any new work orders using information/knowledge mapped onto the system, hence resolution time is reduced. In some embodiments, the input data for a new issue may include textual data as well as an integration of sensor data from the asset in question. For example, sensor data from the same part/machine for which the work order has been raised may be analyzed to enable pinpointing of the actual issue with the asset and help provide a thorough root cause analysis to the service engineers.

Figure 3A:
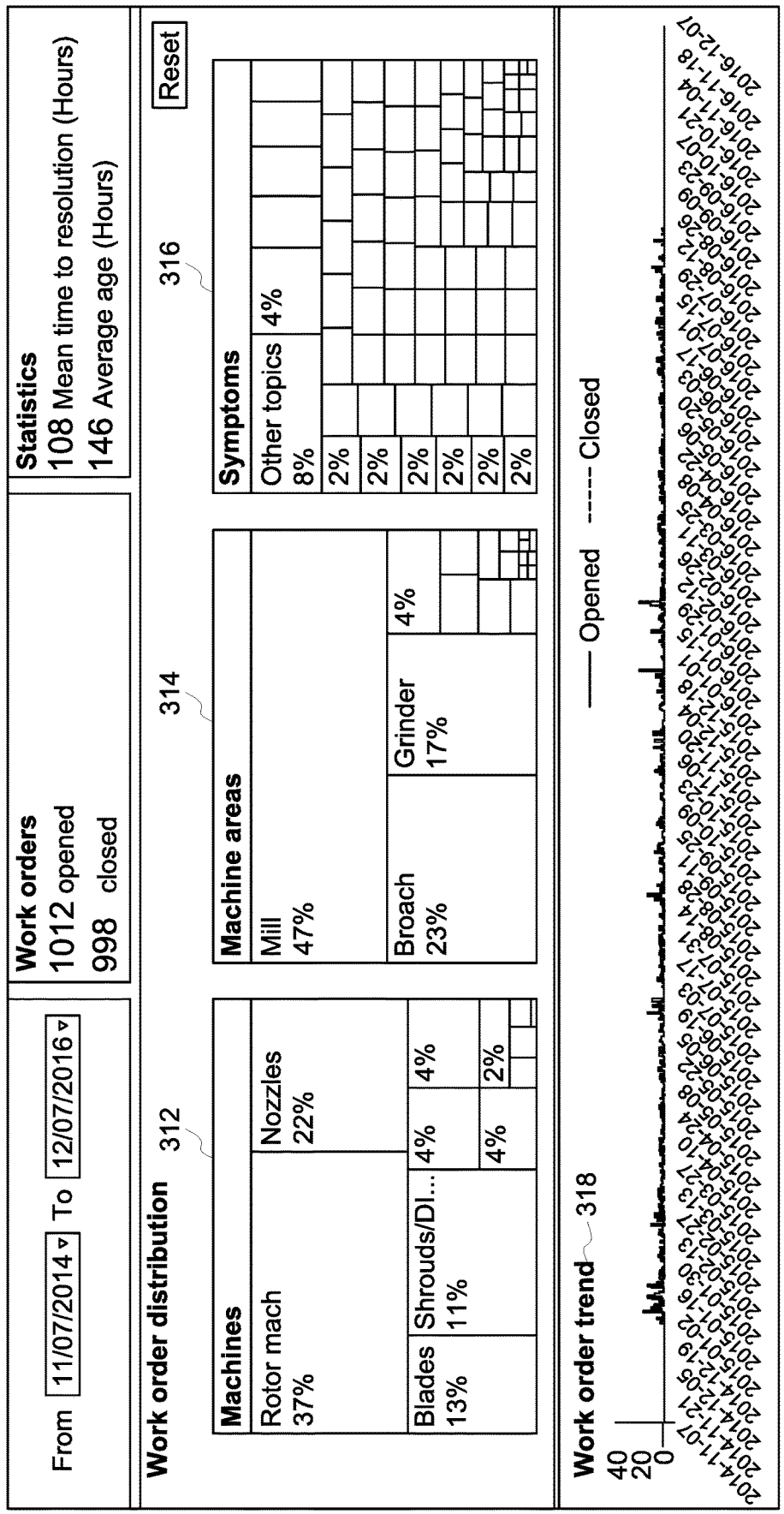

FIGS. 3A and 3B illustrate examples of metrics provided by the knowledge mapping application at work. These results may be output to a user device. In FIG. 3A, user interface 310 illustrates the metrics of work orders at a given plant, factory, location, etc. For example, user interface 310 includes a work order distribution 312 identifying different components of an asset that are having issues, machine areas 314 identifying machine components that are associated with the issues, and symptoms 316 that are associated with the issues. A work order trend 318 also provides an identification of the amount of work orders (i.e., issues) opened and closed over a predetermined period of time. There is also an interface within the user interface 310 that allows a user to specify a range of time of work orders to analyze.

Referring to FIG. 3B, for any selected open work order 3222, user interface 320 displays corresponding similar work orders 324 along with the recommended options 326 for fixing the work order. For example, similar work orders may be determined using a cluster identification method for any new work order. Once the cluster or group of clusters are determined, the closed work orders present in that cluster or group of clusters are displayed to the user.

In any factory or other industrial setting, often there are a lot of machines installed. Changing/removing any of the machines is typically a cost intensive process and results in a huge impact to the business operations. To ensure that all the machines are running in the most optimal way is therefore a strategic decision which needs to be taken by the factory manager or operations manager. To make strategic decisions for the factory where the machines are installed, business heavily depends on the most frequently occurring issue in any given time frame. The example embodiments provide not just the traditional metrics but added multi-level drill downs that will help business make strategic decisions based on multiple dimensions.

Figure 4:
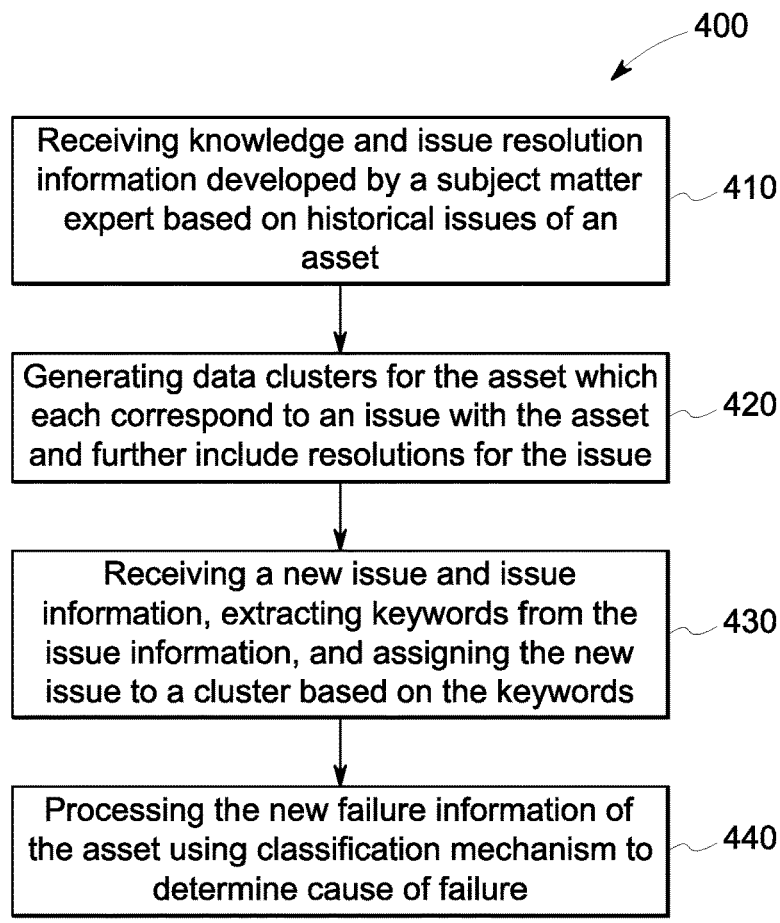
FIG. 4 is a diagram illustrating a method of applying subject matter expert knowledge in accordance with an example embodiment.

FIG. 4 illustrates a method 400 of applying subject matter expert knowledge in accordance with an example embodiment. For example, the method 400 may be performed by the knowledge mapping software described herein and executed on a computing device such as a cloud computing platform, a user device, a server, or the like. Referring to FIG. 4, in 410, the method includes receiving knowledge and issue resolution information developed by one or more subject matter experts in association with historical issues for a type of asset. The type of asset may include a machine or an equipment that is included within an Industrial Internet of Things (IIoT) network. The subject matter expert may include a professional, a technician, and an engineer, or the like, who has personal experience on a professional level with the type of asset. The knowledge received in 410 may be included within documents, files, sensor data, repair notes, work orders, parts lists, and the like. The issue resolution information may also be included in the same materials and may identify fixes that were performed for a given issue. The fix information may include the type of fix, the frequency with which that fix was performed in comparison to other fixes, and the like.

In 420, the method includes generating a plurality of data clusters for the type of asset based on the received knowledge. For example, each historical issue may be mapped to data cluster and may include a plurality of resolutions that are available and that have been performed for that issue. According to various embodiments, the received knowledge for a historical issue may include text data including words, sentences, paragraphs, etc., and the generating may include scanning the text data, extracting keywords from the scanned text data, and assigning the historical issue to the data cluster based on the extracted keywords. For example, the extracting of the keywords may be performed by a rapid automatic keyword extraction (RAKE) algorithm based on a continuous sequence of words. For example, the method may combine advanced clustering, feature extraction, classification and a user feedback loop. Initially (while setting up the system), the historical issue data (resolved) may be uploaded to the system. The knowledge mapping software may create rules to determine how a new work order is assigned to a specific cluster or group of clusters. The subject matter expert can log on to the system to alter the rules based on his/her experience. In addition, the system can also rank the potential resolutions extracted from the closed work orders for a cluster. For example, the ranking may be performed based on a frequency of occurrence of the resolution phrase in that particular cluster.

In 430, the method includes receiving a new issue including new issue information for the type of asset, and processing the new issue by extracting keywords from the new issue information and assigning the new issue to a data cluster from among the plurality of data clusters based on the extracted keywords. In this example, for any new work order, the features and keywords may be extracted therefrom and based on the rules already formed during the system setup, the work order may be mapped to an appropriate clusters and the potential fixes displayed. All the information related to work order resolution is thus brought to a single system where the work order fix information is readily provided, thereby enabling quick diagnosis and resolution of work orders. In some cases, the software may also receive sensor data with the new issue information associated with the new issue, and the assigning the new issue to the data cluster is further performed based on the receive sensor data from the asset. In 440, the method includes outputting, to a display, a ranking of a plurality of resolutions for a historical issue corresponding to the assigned data cluster as potential solutions for the new issue. In some embodiments, the outputting may further outputting similar work orders of historical issues assigned to the data cluster and resolution information for the similar work orders.

Figure 5:
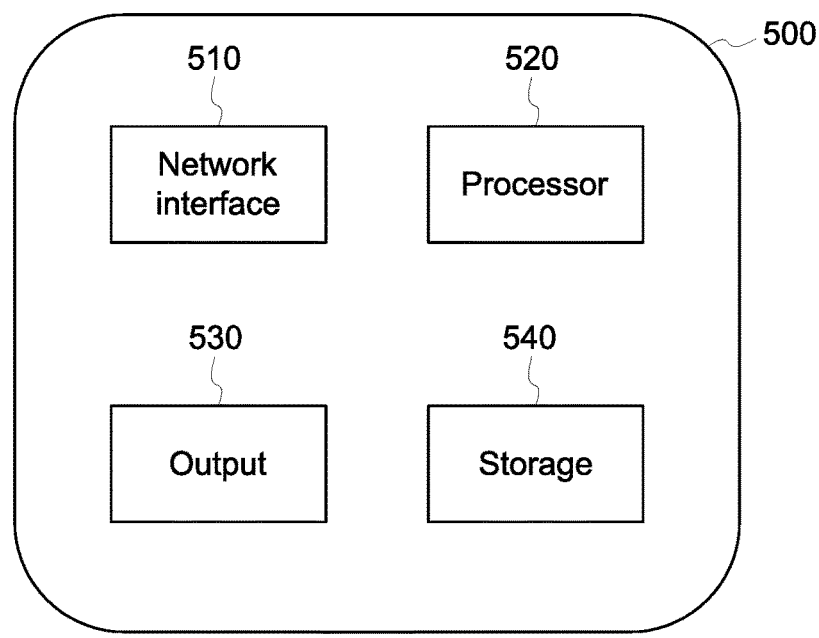
FIG. 5 is a diagram illustrating a computing system for applying subject matter expert knowledge in accordance with an example embodiment.

FIG. 5 illustrates a computing system 500 for applying subject matter expert knowledge in accordance with an example embodiment. For example, the computing system 500 may be a cloud platform, a server, a user device, or some other computing device with a processor. Also, the device 500 may perform the method of FIG. 4. Referring to FIG. 5, the computing system 500 includes a network interface 510, a processor 520, an output 530, and a storage device 540. Although not shown in FIG. 5, the computing system 500 may include other components such as a display, an input unit, a receiver/transmitter, and the like. The network interface 510 may transmit and receive data over a network such as the Internet, a private network, a public network, and the like. The network interface 510 may be a wireless interface, a wired interface, or a combination thereof. The processor 520 may include one or more processing devices each including one or more processing cores. In some examples, the processor 520 is a multicore processor or a plurality of multicore processors. Also, the processor 520 may be fixed or it may be reconfigurable. The output 530 may output data to an embedded display of the device 500, an externally connected display, a cloud, another device, and the like. The storage device 540 is not limited to any particular storage device and may include any known memory device such as RAM, ROM, hard disk, and the like.

According to various embodiments, the network interface 510 may receive knowledge and issue resolution information developed by one or more subject matter experts in association with historical issues for a type of asset. For example, the knowledge and issue resolution information may include raw data such as documents, files, orders, parts lists, repair notes, and the like. The processor 520 may generate a plurality of data clusters for the type of asset based on the received knowledge, wherein each historical issue of the asset is mapped to at least one cluster and includes a plurality of resolutions for the issue. For example, the received knowledge for a historical issue may include textual data, and the processor 520 may scan the text data, extract keywords from the scanned text data, and assign the historical issue to the data cluster based on the extracted keywords. In some embodiments, the processor 520 may extract the keywords using a rapid automatic keyword extraction (RAKE) algorithm that is based on a continuous sequence of words. In some embodiments, the processor 520 is also configured to, for each historical issue, rank the plurality of respective resolutions for the historical issue based on the received knowledge and the issue resolution information.

The network interface 510 may also receive a new issue including new issue information for the type of asset. The new issue may be an issue that has yet to be processed by the computing system 500 or the knowledge mapping software described herein, and not necessarily a new issue never seen before by the knowledge mapping software. The processor 520 may process the new issue by extracting keywords from the new issue information and assigning the new issue to a data cluster from among the plurality of data clusters based on the extracted keywords. In some embodiments, the network interface 510 is further configured to receive sensor data from the asset associated with the new issue, and the processor 520 is further configured to assign the new issue to the data cluster based on the receive sensor data from the asset. The output 530 may output, to a display, a ranking of a plurality of resolutions for a historical issue corresponding to the assigned data cluster as potential solutions for the new issue. In some embodiments, the output 530 may further output similar work orders of a historical issue corresponding to the assigned data cluster and resolution information for the similar work orders.

As will be appreciated based on the foregoing specification, the above-described examples of the disclosure may be implemented using computer programming or engineering techniques including computer software, firmware, hardware or any combination or subset thereof. Any such resulting program, having computer-readable code, may be embodied or provided within one or more non transitory computer-readable media, thereby making a computer program product, i.e., an article of manufacture, according to the discussed examples of the disclosure. For example, the non-transitory computer-readable media may be, but is not limited to, a fixed drive, diskette, optical disk, magnetic tape, flash memory, semiconductor memory such as read-only memory (ROM), and/or any transmitting/receiving medium such as the Internet, cloud storage, the internet of things, or other communication network or link. The article of manufacture containing the computer code may be made and/or used by executing the code directly from one medium, by copying the code from one medium to another medium, or by transmitting the code over a network.

The computer programs (also referred to as programs, software, software applications, "apps", or code) may include machine instructions for a programmable processor, and may be implemented in a high-level procedural and/or object-oriented programming language, and/or in assembly/machine language. As used herein, the terms "machine-readable medium" and "computer-readable medium" refer to any computer program product, apparatus, cloud storage, internet of things, and/or device (e.g., magnetic discs, optical disks, memory, programmable logic devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal that may be used to provide machine instructions and/or any other kind of data to a programmable processor.

The above descriptions and illustrations of processes herein should not be considered to imply a fixed order for performing the process steps. Rather, the process steps may be performed in any order that is practicable, including simultaneous performance of at least some steps. Although the disclosure has been described in connection with specific examples, it should be understood that various changes, substitutions, and alterations apparent to those skilled in the art can be made to the disclosed embodiments without departing from the spirit and scope of the disclosure as set forth in the appended claims.

What is claimed is:

1. A computing system comprising
a memory configured to store historical work orders;
a network interface configured to receive sensor data from an asset which is captured of an issue associated with the asset; and
a processor configured to
dynamically assign different subsets of the historical work orders to different clusters corresponding to different causes, respectively, based on sensor data included in the different subsets of historical work orders,
map the issue to a cluster from among the plurality of clusters based on the sensor data, and
output, via a user interface, information for resolving the issue based on a cause corresponding to the mapped cluster.

2. The computing system of claim 1, wherein the processor is further configured to determine previous actions taken to resolve similar issues assigned to the cluster, and output information about the previous actions via the user interface.

3. The computing system of claim 1, wherein the cluster represents a cause of failure of the asset from among a plurality of causes of failure of the asset which are represented by the plurality of clusters, respectively.

4. The computing system of claim 1, wherein each cluster corresponds to a single cause of failure of the asset.

5. The computing system of claim 1, wherein the asset comprises one or more of an industrial machine and an industrial equipment.

6. The computing system of claim 1, wherein the processor is configured to display a previous order that corresponds to an issue of a same cause, and an identifier of a service technician that resolved the issue.

7. A method comprising
storing historical work orders;
receiving sensor data from an asset which is captured of an issue associated with the asset;
dynamically assigning different subsets of the historical work orders to different clusters corresponding to different causes, respectively, based on sensor data included in the different subsets of historical work orders;
mapping the issue, via a processor, to a cluster from among the plurality of clusters based on the sensor data; and
outputting, via a user interface, information for resolving the issue based on a cause corresponding to the mapped cluster.

8. The method of claim 7, wherein the method further comprises determining previous actions taken to resolve similar issues assigned to the cluster, and outputting information about the previous actions via the user interface.

9. The method of claim 7, wherein the receiving further comprises receiving sensor data of the issue, and the mapping is further performed based on the received sensor data.

10. The method of claim 7, wherein each cluster corresponds to a single cause of failure of the asset.

11. The method of claim 7, wherein the asset comprises one or more of an industrial machine and an industrial equipment.

12. The method of claim 7, wherein the outputting comprises displaying a previous order that corresponds to an issue of a same cause, and an identifier of a service technician that resolved the issue.

13. A non-transitory computer-readable medium comprising instructions which when executed by a processor cause a computer to perform a method comprising:
storing historical work orders;
receiving sensor data from an asset which is captured of an issue associated with the asset;
dynamically assigning different subsets of the historical work orders to different clusters corresponding to different causes, respectively, based on sensor data included in the different subsets of historical work orders;
mapping the issue, via a processor, to a cluster from among the plurality of clusters based on the sensor data; and outputting, via a user interface, information for resolving the issue based on a cause corresponding to the mapped cluster.

14. The non-transitory computer-readable medium of claim 13, wherein the method further comprises determining previous actions taken to resolve similar issues assigned to the cluster, and outputting information about the previous actions via the user interface.

15. The non-transitory computer-readable medium of claim 13, wherein the cluster represents a cause of failure of the asset from among a plurality of causes of failure of the asset which are represented by the plurality of clusters, respectively.

16. The non-transitory computer-readable medium of claim 13, wherein each cluster corresponds to a single cause of failure of the asset.

17. The non-transitory computer-readable medium of claim 13, wherein the outputting comprises displaying a previous order that corresponds to an issue of a same cause, and an identifier of a service technician that resolved the issue.

* * * * *